(12) United States Patent
Nishino

(10) Patent No.: US 6,594,046 B1
(45) Date of Patent: Jul. 15, 2003

(54) LEVEL-FLATTENING CIRCUIT FOR WDM OPTICAL SIGNALS

(75) Inventor: Masaru Nishino, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/307,976

(22) Filed: May 10, 1999

(30) Foreign Application Priority Data

May 11, 1998 (JP) ........................................... 10-142046

(51) Int. Cl.[7] .............................. H04J 14/02; H01S 3/00; H04B 10/12
(52) U.S. Cl. ..................... 359/124; 359/337; 359/341.4
(58) Field of Search ................................. 359/161, 124, 359/130, 115, 341.4, 337

(56) References Cited

U.S. PATENT DOCUMENTS

| | | | | |
|---|---|---|---|---|
| 5,002,350 A | * | 3/1991 | Dragone ................. 350/96.15 |
| 5,546,483 A | * | 8/1996 | Inoue et al. ................. 385/14 |
| 5,726,785 A | | 3/1998 | Chawki et al. | |
| 5,748,349 A | | 5/1998 | Mizrahi | |
| 5,815,299 A | * | 9/1998 | Bayart et al. ................ 359/171 |
| 6,031,659 A | * | 2/2000 | Okiyama ................... 359/341 |
| 6,055,092 A | * | 4/2000 | Sugaya et al. .............. 359/337 |
| 6,094,296 A | * | 7/2000 | Kosaka | |
| 6,134,034 A | * | 10/2000 | Terahara ..................... 359/124 |
| 6,137,604 A | * | 10/2000 | Bergano ..................... 359/124 |
| 6,181,449 B1 | * | 1/2001 | Taga et al. .................. 395/124 |

FOREIGN PATENT DOCUMENTS

| | | |
|---|---|---|
| JP | 59-099829 | 6/1984 |
| JP | 07-30520 | 1/1995 |
| JP | 8-278523 | 10/1996 |
| JP | 9-36834 | 2/1997 |
| JP | 09-224016 | 8/1997 |
| JP | 09-247093 | 9/1997 |
| JP | 9-321740 | 12/1997 |

* cited by examiner

Primary Examiner—Jason Chan
Assistant Examiner—Shi K. Li
(74) Attorney, Agent, or Firm—Scully, Scott, Murphy & Presser

(57) ABSTRACT

It is an object of the invention to provide a level-flattening circuit for WDM optical signals which can be used in an optical signal repeating station. A level flattening circuit for WDM optical signals is supplied with WDM optical signal and demultiplexs them into individual optical signals having different wavelengths, levels of which are separately feedback controlled to provide flattened optical signal levels.

3 Claims, 3 Drawing Sheets

SPECTRUM OF INPUT OPTICAL SIGNALS OF
LEVEL-FLATTENING CIRCUIT
(SPECTRUM AT 101)

SPECTRUM OF OUTPUT OPTICAL SIGNALS OF
LEVEL-FLATTENING CIRCUIT
(SPECTRUM AT 161)

LEVEL-FLATTENING CIRCUIT FOR WDM OPTICAL SIGNALS

The invention relates to a wavelength division multiplexed (MDW, hereinafter) optical communication system, and especially to a level-flattening circuit for WDM optical signals for maintaining optical powers of repeating optical signals at a constant level throughout whole wavelengths.

BACKGROUND OF THE INVENTION

In a conventional technology disclosed in Japanese Patent Kokai 7-30520, n (n is an integer) optical transmitters generate n optical signals having n different wavelengths $\lambda_1$ to $\lambda_n$, and these optical signals are respectively attenuated by n optical attenuators corresponding wavelengths of $\lambda_1$ to $\lambda_n$, multiplexed by a wavelength division multiplexer, amplified by an Er-doped optical fiber, and transmitted therefrom. In most cases, the optical signals are plus code modulated.

A part of optical energy of the WDM optical signals is split by an optical splitter, and demultiplexed by a wavelength division demultiplexer into n optical signals having the wavelengths of $\lambda_1$ to $\lambda_n$, which are respectively detected by optical to electrical converters (O/E converters, hereinafter) corresponding to the wavelengths of $\lambda_1$ to $\lambda_n$. The aforementioned optical attenuators corresponding to the n optical signals are respectively feedback controlled based on the outputs of the n O/E convertors.

In this way, powers of the WDM optical signals amplified by the Er-doped optical fiber amplifier are maintained at a constant level throughout the whole wavelengths.

However, the aforementioned level-flattening circuit for the WDM optical signals is designed as an apparatus to be used in an optical signal transmitting station, which is provided with plural optical transmitters for generating plural optical signals having the wavelengths of $\lambda_1$ to $\lambda_n$, and cannot be used in an optical signal repeating station.

If the principle of the aforementioned level-flattening circuit for the WDM optical signals is directly applied to the same used in the optical signal repeating station, the individual optical signal levels in the optical signal repeating station must be transmitted to the optical signal transmitting station in order to constitute a feedback loop, the system is magnified, and a statistactry result cannot be obtained.

SUMMARY OF THE INVENTION

Accordingly, it is an object of the invention to solve problems in the aforementioned level-flattening circuit for WDM optical signals, and provide a level-flattening circuit for WDM optical signals which can be applied to a optical signal repeating station.

According to a feature of the invention, a level-flattening circuit for WDM optical signals comprises;

A wavelength division demultiplexer, which is supplied with the WDM optical signals and demultiplexing them into individual optical signals having different wavelengths, optical attenuators provided for the individual optical signals supplied from the wavelength division demultiplexer, optical splitters, which split the individual optical signals supplied from the optical attenuators at a predetermined rate, photodiodes for converting the split optical signals supplied from the optical splitters into electrical signals, a control circuit, which feedback controls attenuations of the optical attenuators corresponding to the photodiodes so that the electrical signals outputted from the photodiodes are maintained at respective predetermined levels, and a wavelength division multiplexer for multiplexing the individual optical signals passed through the optical splitters.

BRIEF DESCRIPTION OF THE DRAWINGS

The invention will be explained in more detail in conjunction with appended drawings, wherein.

DESCRIPTION OF THE PREFERRED EMBODIMENTS

Thereafter, preferred embodiments of the invention will be explained referring to the amended drawings.

Figure 1A:
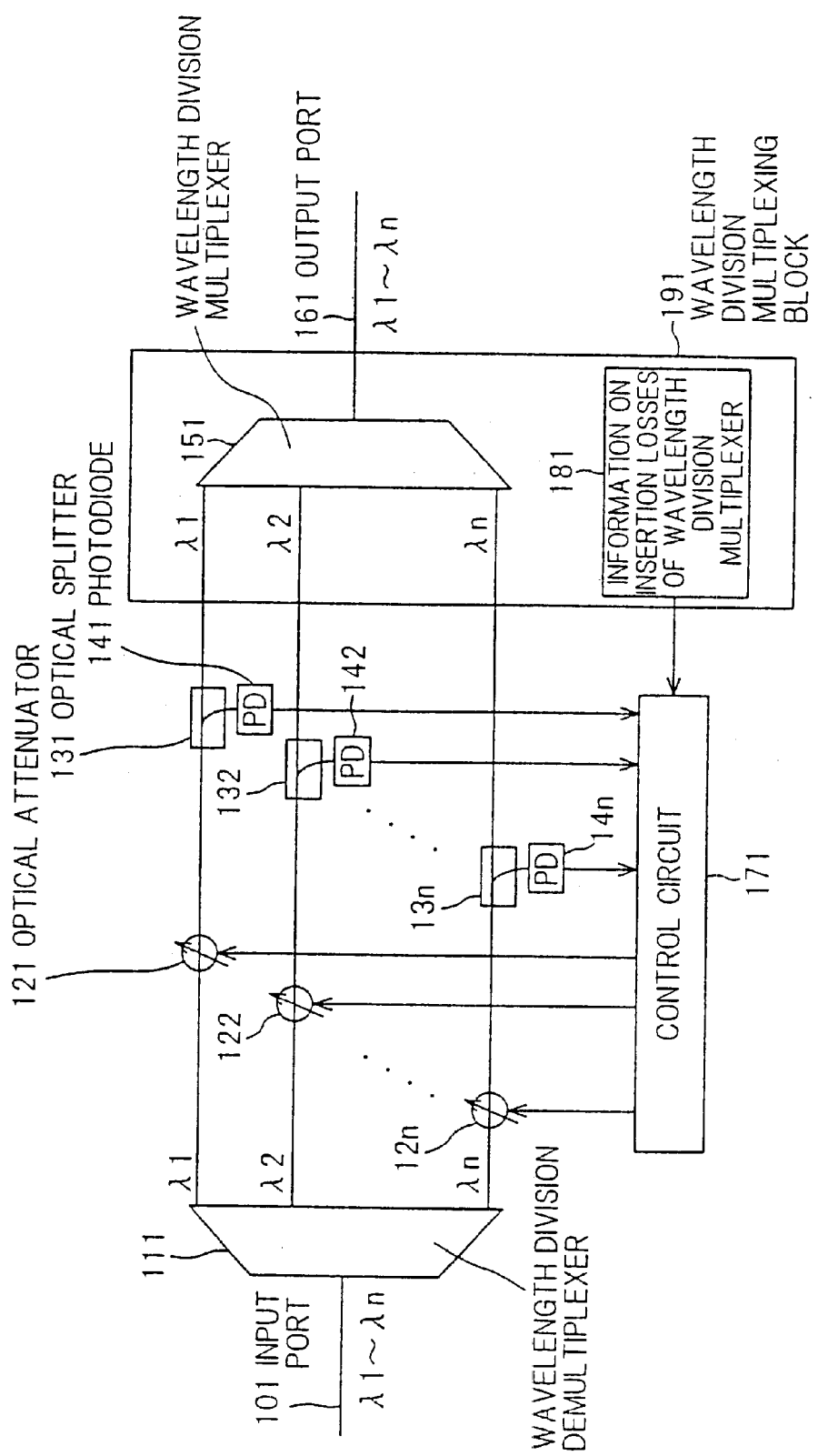
FIG. 1A shows a block diagram of a preferred embodiment of the invention.

FIG. 1A is a block diagram for showing a preferred embodiment of the invention. In FIG. 1A, optical signals having wavelengths of $\lambda_1, \lambda_2, \ldots \lambda_i, \ldots \lambda_n$ are multiplexed and supplied to an input port 101, where n is a natural number, and i is a natural number arbitrarily selected from a series, 1 to n.

The inputted optical signals are demultiplexed into individual optical signals having wavelengths of $\lambda_1, \lambda_2, \ldots \lambda_i, \ldots \lambda_n$ by a wavelength division demultiplexer 111, and they are respectively supplied to optical attenuators 121, 122, ... 12i, ... 12n, which respectively correspond to the wavelength $\lambda_1$ to $\lambda_n$.

That is to say, the optical signal of the wavelength $\lambda_1$ is supplied to the optical attenuator 121, the optical signal of the wavelength $\lambda_2$ to the optical attenuator 122, and the optical signal of the wavelength $\lambda_i$ to the optical attenuator 12i.

The optical signals outputted from the optical attenuators 121, 122, ... 12i, ... 12n respectively pass through corresponding optical splitters 131, 132, ... 13i, ... 13n, are again multiplexed by awavelength division multiplexer 151, and outputted from an output port 161.

The wavelength division demultiplexer 111 and the wavelength division multiplexer 151 can be realized by arrayed waveguide gratings (AWGs). These structural elements can be realized by other optical circuit elements, such as optical couplers, optical filters, and fiber gratings also.

Optical power split by the optical splitter 13i is converted into a voltage signal by a photodiode 14i, and a control circuit 171 feedback controls an optical attenuator 12i so that the aforementioned voltage signal is kept to be a predetermined value. Although 12i, 13i, and 14i are not explicitly shown in FIGS. 1A and 1B, their meanings would be clear recalling the fact that i is an integer arbitrarily selected from a series, 1 to n.

For instance, the control circuit 171 is provided with a comparator 20 shown in FIG. 1B connected with the photodiode 14i, and controls the attenuation of the optical attenuator 12i in a way mentioned as follows. If the output voltage of the photodiode 14i is higher than a predetermined value, the attenuation of the optical attenuator 12i is increased. If the output voltage of the photodiode 14i is lower than the predetermined value, the attenuation of the optical attenuator 12i is reduced. In this way, the optical power inputted to the photodiode 14i is kept to be constant.

Since the coupling coefficient of the optical splitter 13i is constant, the optical power supplied to the photodiode being maintained at a constant level means the optical power supplied to the wavelength division multiplexer 151 being maintained at constant level, hence means the output power levels of the WDM optical signals at the output port 161 being made flattened.

Figure 2:
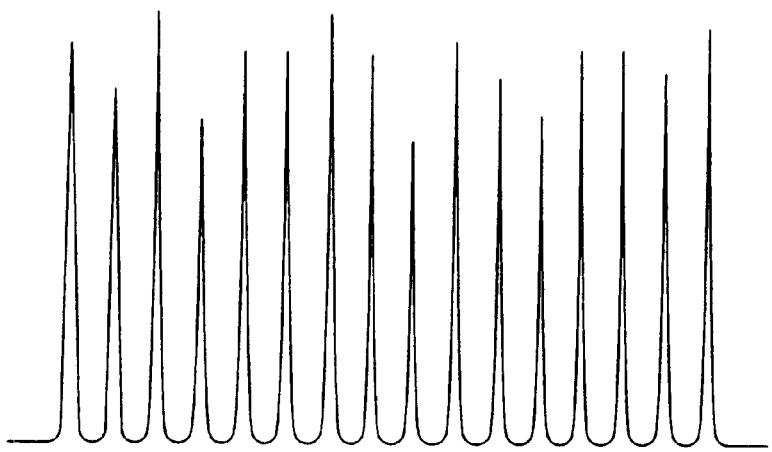
FIG. 2 shows a spectrum of WDM optical signals at an input port of a circuit according to the invention.
Figure 3:
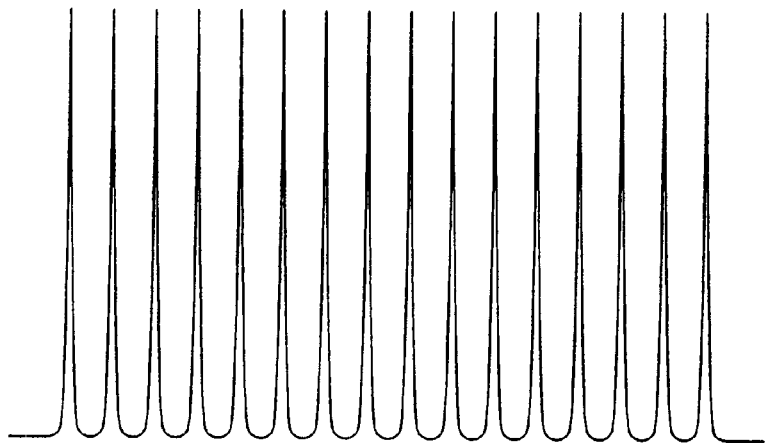
FIG. 3 shows a spectrum of WDM optical signals at an output port of a circuit according to the invention.

FIG. 2 shows an example of a spectrum of the WDM optical signals at the input port 101 shown in FIG. 1A, and FIG. 3 shows a spectrum of the WDM optical signals at the output port 161, which is flattened by a circuit according to the invention.

Now then, insertion losses of the optical signals in the wavelength division multiplexer 151 are different from each other in accordance with the wavelengths of the optical signals. Accordingly, if the wavelength division multiplexer 151 is interchanged, feedback control of the optical signal levels must be adjusted over again.

Figure 1B:
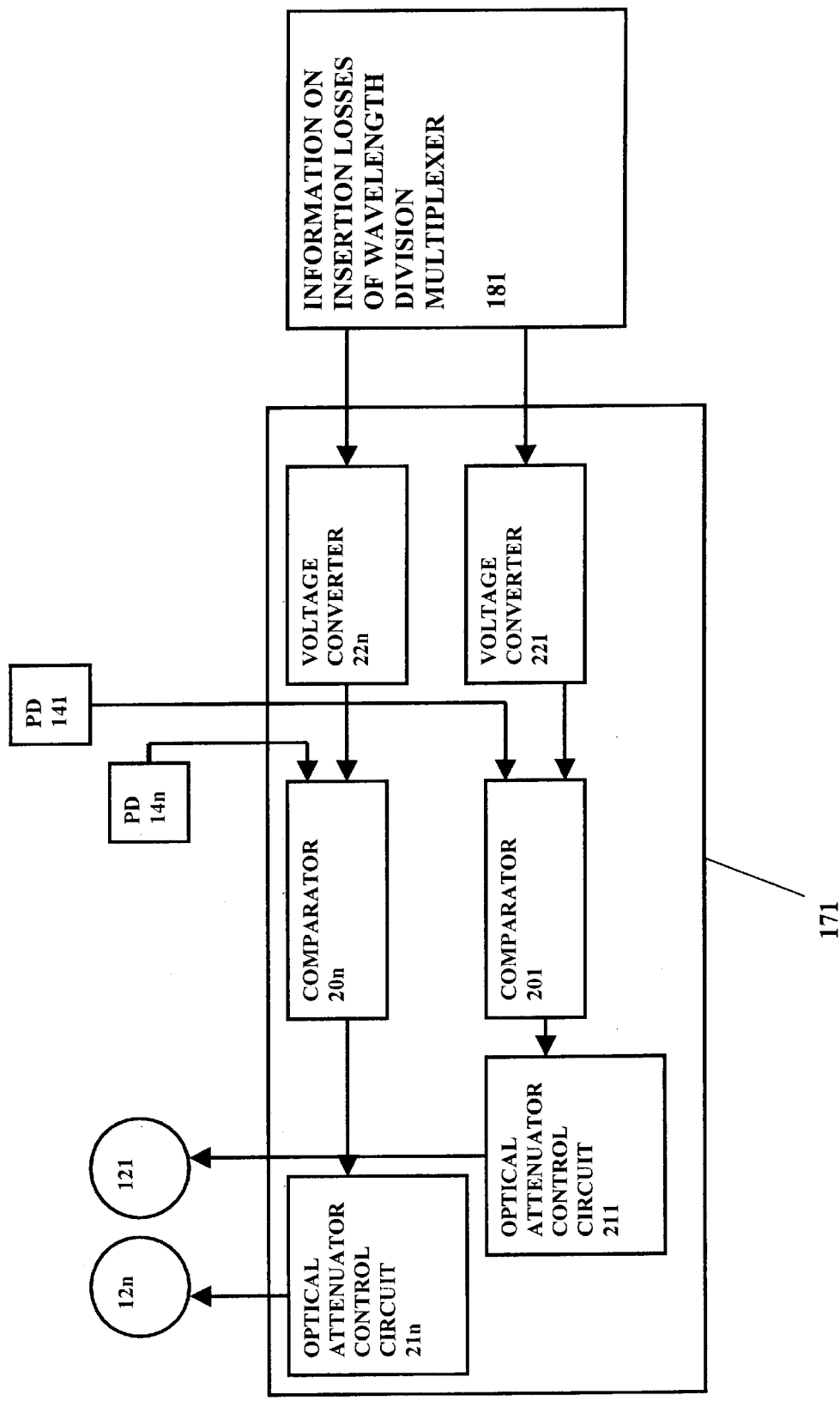
FIG. 1B shows a detail of a feature of the preferred embodiment of the invention of FIG. 1A.

As mentioned in the above, in the control circuit 171 shown in detail in FIG. 1B, since the photodiode 14i is provided with the comparator 20i which compares the output voltage of the photodiode 14i with a reference voltage and feedback controls, by means of optical attenuator control circuits 211 to 21n, the attenuation of the optical attenuator 12i so that the output voltage of the photodiode 14i becomes equal to the reference voltage, the insertion loss 181 of the wavelength division multiplexer can be compensated by adjusting the reference voltage of the comparator 20i by means of voltage converters 221 to 22n.

Accordingly, the wavelength division multiplexer 151 is combined with information 181 on the insertion losses of the wavelength division multiplexer and completed as the wavelength division multiplexing block 191. Since the wavelength division multiplexer 151 being interchanged means the wavelength division multiplexing block 191 being interchanged, information on the insertion losses of the wavelength division multiplxer 151 is transmitted to the control circuit 171, and the control circuit 171 sets the reference voltages of the respective comparators based on information mentioned in the above.

For example, if information that the insertion loss of the optical signal of the wavelength $\lambda_i$ in the multiplexer 151 is di dB is transmitted to the control circuit 171 by information 181 on the insertion losses of the wavelength division multiplexer, the control circuit 171 increases the reference voltage of the comparator 20i by di dB. Accordingly, the output of the optical attenuator 12i is controlled so that it is increases by di dB, hence the insertion loss of di dB in the wavelength division multiplexer 151 can be compensated and the output levels of the optical signals can be flattened.

As mentioned in the above, the intensities of the WDM optical signals in the repeater station can be flattened by the circuit according to the invention. Moreover, since the insertion losses of the wavelength division multiplexer can be compensated, the system can operate continuously, even when the wavelength division multiplexer for the WDM optical signals is interchanged.

What is claimed is:

1. A level-flattening circuit for wavelength division multiplexed (WDM, hereinafter) optical signals, comprising:

a wavelength division demultiplexer, which is supplied with said WDM optical signals and demultiplexing them into individual optical signals having different wavelengths, optical attenuators provided for said individual optical signals supplied from said wavelength division demultiplexer, optical splitters, which split said individual optical signals supplied from said optical attenuators at a predetermined rate, photodiodes for converting said split optical signals supplied from said optical splitters into electrical signals, a control circuit, which feedback controls attenuations of said optical attenuators corresponding to said photodiodes so that said electrical signals outputted from said photodiodes are maintained at respective predetermined levels, and a wavelength division multiplexer for multiplexing said individual optical signals passed through said optical splitters, said control circuit is provided with comparators, each of which is supplied with said electrical signal outputted from said photodiode at a first input terminal thereof and said reference voltage corresponding to said predetermined level at a second input terminal thereof, and feedback controls said attenuation of said optical attenuator corresponding to said photodiode based on an output voltage thereof, and said reference voltage supplied to said second input terminal of said comparator is determined referring to an insertion loss of a corresponding optical signal in said wavelength division multiplexer.

2. The level-flattening circuit as defined in claim 1, wherein:

said wavelength division demultiplexer and said wavelength division multiplexer are respectively formed of arrayed waveguide gratings.

3. The level-flattening circuit as defined in claim 1, wherein:

said wavelength division multiplexer is provided with means for notifying information on said insertion losses of said individual optical signals in said wavelength division multiplexer, and said information on said insertion losses is transmitted to said control circuit, when said wavelength division multiplexer is connected with said control circuit.

* * * * *